(12) United States Patent
Wang et al.

(10) Patent No.: US 10,494,271 B2
(45) Date of Patent: Dec. 3, 2019

(54) ECOLOGICAL METHOD FOR DENITRIFICATION AND PHOSPHORUS REMOVAL IN WASTEWATER TREATMENT PROCESS

(71) Applicant: Jiangnan University, Wuxi (CN)

(72) Inventors: Shuo Wang, Wuxi (CN); Zhengming Ren, Wuxi (CN); Ji Li, Wuxi (CN); Yan Wang, Wuxi (CN)

(73) Assignee: Jiangnan University, Wuxi, Jiangsu (CN)

( * ) Notice: Subject to any disclaimer, the term of this patent is extended or adjusted under 35 U.S.C. 154(b) by 266 days.

(21) Appl. No.: 15/795,082

(22) Filed: Oct. 26, 2017

(65) Prior Publication Data

US 2018/0134580 A1    May 17, 2018

(30) Foreign Application Priority Data

Nov. 15, 2016   (CN) .......................... 2016 1 1004494

(51) Int. Cl.
*C02F 1/28*   (2006.01)
*C02F 1/461*   (2006.01)
(Continued)

(52) U.S. Cl.
CPC .............. *C02F 1/281* (2013.01); *C02F 1/461* (2013.01); *C02F 1/66* (2013.01); *C02F 9/00* (2013.01);
(Continued)

(58) Field of Classification Search
CPC ................ B01J 20/0229; B01J 2220/42; B01J 2220/56; C02F 1/281; C02F 2101/105;
(Continued)

(56) References Cited

U.S. PATENT DOCUMENTS 8,258,076 B2 *   9/2012   Suzuki ................... B01D 15/00
                                                        210/660
8,394,267 B2 *   3/2013   Moniwa ............... B01J 20/3204
                                                        210/190
(Continued)

FOREIGN PATENT DOCUMENTS

CA         2919827     * 12/2014

*Primary Examiner* — Ana M Fortuna
(74) *Attorney, Agent, or Firm* — IPro, PLLC; Na Xu

(57) ABSTRACT

The present invention provides an ecological method for denitrification and phosphorus removal in wastewater treatment process, which relates to the field of sewage treatment technology, The present invention provides a nitrogen and phosphorus removal system, comprising a nitrogen and phosphorus removal unit and a sulfate adsorption unit. The nitrogen and phosphorus removal unit is packed with coarse sand layer, deoxidizing layer and sulfur/iron mixture layer, while the sulfate adsorption unit is filled with modified hydrotalcite. Both of the units are filled with solid material, which effectively avoid the contamination that causes by liquid carbon source feeding. The application of the present invention can realize a completely denitrification, which achieve a maximum removal rate of 100%, a phosphorus removal efficiency of about 80%. The TP concentration is below 0.5 mg/L in the treated effluent, while the average sulfate removal rate is about 50%.

8 Claims, 4 Drawing Sheets

(51) Int. Cl.
  *C02F 1/66* (2006.01)
  *C02F 9/00* (2006.01)
  *C02F 101/16* (2006.01)
  *C02F 101/10* (2006.01)
  *C02F 1/00* (2006.01)
  *C02F 1/70* (2006.01)
  *C02F 3/00* (2006.01)
  *C02F 3/10* (2006.01)
  *C02F 3/28* (2006.01)
  *C02F 3/34* (2006.01)

(52) U.S. Cl.
  CPC ............... *C02F 1/001* (2013.01); *C02F 1/70* (2013.01); *C02F 1/705* (2013.01); *C02F 3/005* (2013.01); *C02F 3/104* (2013.01); *C02F 3/2826* (2013.01); *C02F 3/345* (2013.01); *C02F 3/346* (2013.01); *C02F 2101/101* (2013.01); *C02F 2101/105* (2013.01); *C02F 2101/16* (2013.01); *C02F 2101/163* (2013.01); *C02F 2209/22* (2013.01); *C02F 2209/40* (2013.01); *C02F 2303/16* (2013.01); *C02F 2305/06* (2013.01)

(58) Field of Classification Search
  CPC .......... C02F 9/00; C02F 2101/16; C02F 1/28; C02F 1/461; C02F 1/66; C02F 1/001
  See application file for complete search history.

(56) References Cited

U.S. PATENT DOCUMENTS

| | | | |
|---|---|---|---|
| 2012/0024027 A1* | 2/2012 | Tsuji | B01J 20/0229 71/48 |
| 2014/0260468 A1* | 9/2014 | Bezbaruah | B01J 20/267 71/27 |
| 2016/0311712 A1* | 10/2016 | Li | C02F 1/281 |

* cited by examiner

ECOLOGICAL METHOD FOR DENITRIFICATION AND PHOSPHORUS REMOVAL IN WASTEWATER TREATMENT PROCESS

CROSS-REFERENCES AND RELATED APPLICATIONS

This application claims the benefit of priority to Chinese Application No. 201611004494.6, entitled "An ecological and safe method for wastewater denitrification and phosphorus removal in sewage treatment plant", filed Nov. 15, 2016, which is herein incorporated by reference in its entirety.

BACKGROUND OF THE INVENTION

Field of the Invention

The present invention relates to the field of wastewater treatment technology, which relates to an ecological and safe method for denitrification and phosphorus removal in wastewater treatment process.

Description of the Related Art

Nitrogen (N) and phosphorus (P) are the key nutrients causing eutrophication in waterways. At present, nitrogen and phosphorus removal is mostly accomplished by anaerobic-anoxic-oxic (A2O) process. However, the effluent still contains high concentration of nitrogen and phosphorus, which needs further treatment through adding carbon source and inorganic chemical agents. Thus leads to more operating costs and additional follow-up process to remove supernumerary organic substance.

Method of sulfur autotrophic denitrification is widely concerned in nitrogen and phosphorus removal because of the simple equipment, low costs and non-required external carbon source. The process of the method consumes alkalinity by limestone. Current researches are focused on the ratio of sulfur and limestone that been used in the method. Since the slow release of alkalinity, the water hardness increases, which limits the full-scale applications of sulfur and limestone mixture. In addition, the sulfuric acid that produced during the sulfur autotrophic denitrification process greatly influences the release of phosphorus from environmental sediments. Besides, sulfate is more harmful in the static water, which makes it necessary to develop a new method to optimize the operational parameters of denitrification and phosphorus removal in wastewater treatment process.

DETAILED DESCRIPTION

The present invention provides a new type of nitrogen and phosphorus removal process for reducing the nitrogen and phosphorus pollution in the sewage while avoiding the secondary pollution to the environment. In this invention, the sulfur autotrophic nitrification process is coupled with the iron-carbon micro-electrolysis process to carry out the deep nitrogen and phosphorus removal, and maintained the stable pH of the sewage. The adsorption unit packing with modified hydrotalcite is arranged after the main process for adsorption of sulfate, which achieves high efficient of the denitrification and phosphorus removal process and improves the practicality of the process.

The first goal of the present invention is to provide a nitrogen and phosphorus removal system, comprising a nitrogen and phosphorus removal unit and a sulfate adsorption unit; the wastewater enters into the nitrogen and phosphorus removal unit from the bottom of the unit and leaves from the top, during which wastewater sequentially flows through different layers including coarse sandy layer, deoxidizing layer and nitrogen and phosphorus removal layer; the wherein said nitrogen and phosphorus removal layer is packed with mixture of sulfur and iron, the weight ratio of sulfur and iron is 3-6:1; the wherein said sulfate adsorption unit is packed with hydrotalcite, and connects with the wherein said nitrogen and phosphorus removal unit by the pipes.

In one embodiment of the present invention, mixture of sulfur and iron is the sulfur granule packed with iron inside.

In one embodiment of the present invention, the deoxidizing layer is packed with sulfur.

In one embodiment of the present invention, a tank is set up in the front of the nitrogen and phosphorus removal unit.

In one embodiment of the present invention, a pump is arranged between the tank and the nitrogen and phosphorus removal unit.

The second goal of the present invention is to provide a method for wastewater treatment using the wherein said nitrogen and phosphorus removal system.

In one embodiment of the present invention, the wherein said method is carried out through removing the nitrogen and phosphorus in wastewater by the wherein said nitrogen and phosphorus removal unit, followed by sulfate removal by the sulfate adsorption unit.

In one embodiment of the present invention, the flow rate of wastewater in the nitrogen and phosphorus removal unit is 2~3 $m^3/h$, the DO of the treated wastewater that leaving from the deoxidizing layer is below 0.5 mg/L, the HRT is 0.2~0.5 h, and the flow rate is 7~9 m/h.

In one embodiment of the present invention, the flow rate of wastewater in the nitrogen and phosphorus removal unit is 2.5 $m^3/h$, the DO of the treated wastewater leaving from the deoxidizing layer is below 0.5 mg/L, the HRT is 0.35 h, and the flow rate is 8.8 m/h.

In one embodiment of the present invention, the method comprises a step of back flushing, which is flushing the wherein said nitrogen and phosphorus removal system at 40 $m^3/h$ for 4~6 min.

The raw material packing in the nitrogen and phosphorus removal system are solid sulfur, iron and hydrotalcite, which are effectively in avoiding the contamination that caused by addition of liquid carbon sources. The autotrophic process on the basis of sulfur acting as an electron donor can effectively remove the nitrate of the sewage, which makes denitrification more complete. No nitrite has been detected in the treated effluent, and the maximum removal rate reaches to 100%. The HRT of the process is 2.35 h, which is much shorter than the traditional A2O denitrification and phosphorus removal process (HRT 4-6 h). The quantity of residual sludge is small, so as the area covered by the system. The combination of iron-carbon micro-electrolysis and sulfur autotrophic denitrification not only provides alkalinity for denitrification, maintains the pH stability for the system, but helps to phosphorus removal as well, which effectively reducing costs of the wastewater treatment, The efficiency of phosphorus removal is about 80%, the TP concentration of effluent is below 0.5 mg/L. The subsequent sulfate adsorption unit reduces the concentration of sulfate and leads to the average removal rate of sulfate at about 50%.

The present invention combines the sulfur autotrophic denitrification, iron-carbon microelectrolysis and the sulfate adsorption, and conducted on a process at the scale of 100 m³. The desired effect is obtained, the minimum concentration of $NO_3$—N can be reduced to zero, the TP concentration in the effluent is less than 0.5 mg/L, the average removal rate of sulfate is above 50%, and there is no adverse effect to the ecosystem.

DETAILED DESCRIPTION

Example 1 Design of the Nitrogen and Phosphorus Removal System

Figure 1:
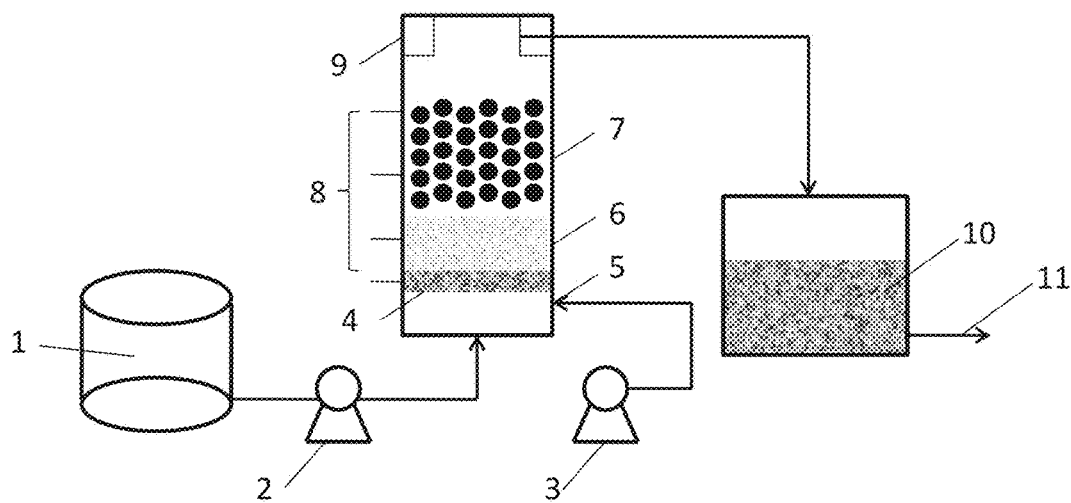
FIG. 1 illustrates the flow chart of the nitrogen and phosphorus removal system; 1, water tank; 2, inlet pump; 3, back flushing pump; 4, coarse sand layer; 5, back flushing inlet; 6, deoxidizing layer; 7, nitrogen and phosphorus removal layer; 8, sample outlets; 9, downflow weir; 10, modified hydrotalcite layer, 11, outlet.

As shown in FIG. 1, the nitrogen and phosphorus removal system comprises a water tank (1), a denitrification and phosphorus removal unit and a sulfate adsorption unit. An inlet pump (2) is provided between the water tank (1) and the denitrification and phosphorus removal unit. The denitrification and phosphorus removal unit consists of coarse sand layer (4), deoxidizing layer (6) and nitrogen and phosphorus removal layer (7). The downflow weir (9) is arranged at the top of the denitrification and phosphorus removal unit, and the sample outlets (8) are set on the side wall of the unit. The back flushing inlet (5) is arranged at the bottom of the unit, from which connects the sulfate adsorption unit with the back flushing pump (3); the sulfate adsorption unit is packed with modified hydrotalcite layer (10). The modified hydrotalcite layer (10) is packed in the sulfate adsorption unit, and connected with the denitrification and phosphorus removal unit on one side, and the outlet (11) is set on the other side.

The nitrogen and phosphorus removal unit is a cylindrical reactor, with a height of 3.1 m, an effective height of 3.1 m, an inner diameter of 0.6 m, and an empty bed volume of 0.88 m³. The buffer zone of the inlet wastewater is from the bottom to 0.5 m high of the reactor. Water distributor is arranged in this zone to distribute water. The coarse sand layer with particle size of 4-8 mm and thickness of 0.1 m is packed above the water distributor. The packing layers of the reactor comprise deoxidizing layer and nitrogen and phosphorus removal layer. The deoxidizing layer is filled with sulfur (particle size of 2~4 mm) of a 0.5 in thickness. The nitrogen and phosphorus removal layer is filled with mixture of sulfur and iron at about 1.3 m high. The particle size of sulfur is the same with that in deoxidizing layer. The iron is embedded in the 8 cm-diameter plastic ball, with a total amount of 385. The total quality of sulfur been embedded is 0.3 t, and the total quality of sulfur been embedded is 0.063 t. The quality ratio of sulfur and iron is 4.8:1, and the volume ratio is 3.1:1.

The sulfate adsorption unit is 2 in long, 1.5 m wide and 3 m high. The total volume of the adsorption pond is 9 m³, filled with modified hydrotalcite on a height of 2 m. The modified hydrotalcite is prepared by following steps: $Mg(NO_3)_2 \cdot 6H_2O$ and $Al(NO_3)_3 \cdot 9H_2O$ is weighed at a mole ratio of 3:1, then mixed and dissolved in 1 L secondary distilled water. NaOH and $Na_2CO_3$ are weighed and dissolved in secondary distilled water, in which n $(CO_3^{2-})$/n $(Al^{3+})$ and $n(NaOH)/n(Mg^{2+}+Al^{3+})$ are 2.0. Solution is rapidly mixed together, the pH is adjusted to 9.5 and then a white syrup is obtained. The mixture is placed in 75° C. water bath for 12 h. The resulting solution is cooled and filtered; the solid obtained from the filtration is washed to neutral pH, dried at 80° C. and ground. The hydrotalcite was calcined at 400° C. for 3 h, and then modified hydrotalcite is obtained.

Example 2 Operation of Nitrogen and Phosphorus Removal System (1) System Startup The startup procedure comprises two stages: inoculation period, incubation period. During inoculation period, the concentrated sludge and $NO_3^-$—N is fed into the water tank, and then microorganisms are inoculated in the water tank through wastewater under low flow in and out of the system. 10 days later, the wastewater continuously access and leave from the system under a low flow rate, and then incubation period begins. The potassium dihydrogen phosphate is fed into the system to promote microbial growth. After 20~40 days incubation, the denitrification effect of the system increased obviously, and the yellowish brown biofilm appeared on the surface of the filler. The denitrification load reached 100 g/(m³·d), so that the startup process is finished.

(2) Stable Operation of the System

Figure 2:
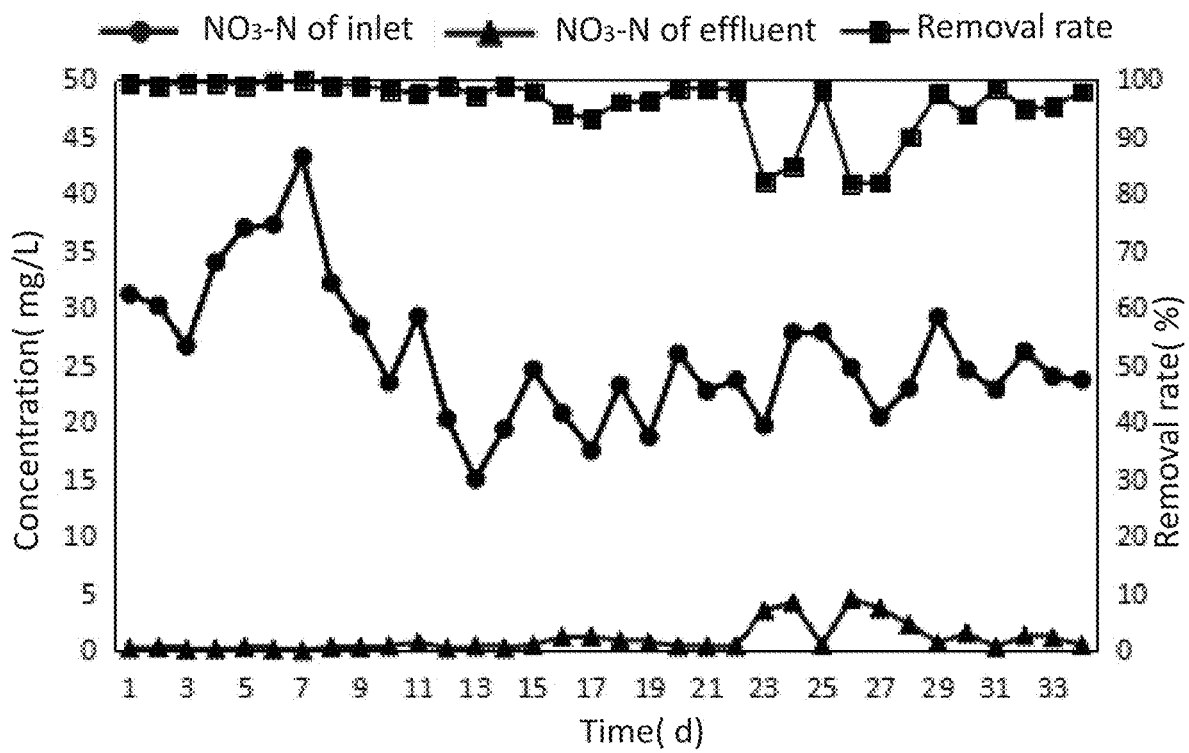
FIG. 2 illustrates changes and removal rate of $NO_3$—N in the inlet and outlet water.
Figure 3:
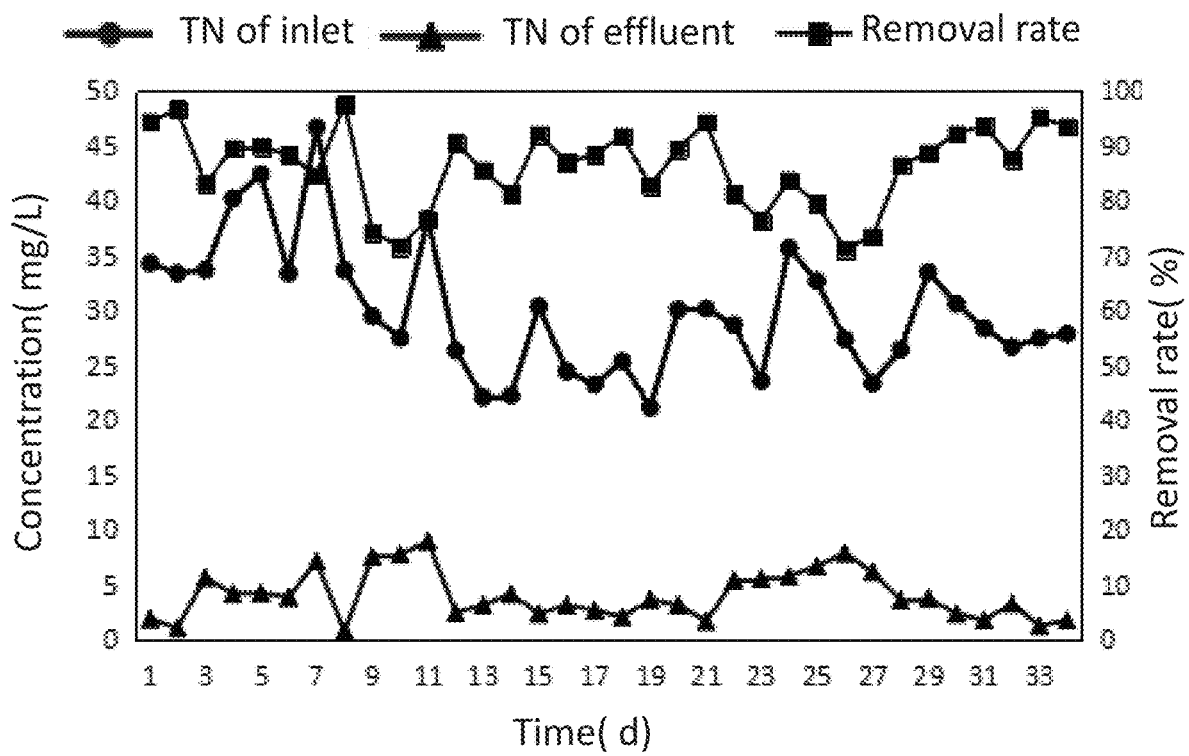
FIG. 3 illustrates changes and removal rate of TN in the inlet and outlet water.

The stable operating flow of the system is finally set at 2.5 m³/h. During the stable operation period, the dissolved oxygen (DO) in the influent is minimized and the DO leave from the deoxidizing layer is less than 0.5 mg/L, which avoids decreasing denitrification efficiency leading from high DO. The HRT is kept at 0.35 h, and the flow rate is 8.8 m/h. The system needs back flushing timely at 40 m³/h for 4-6 min to keep the system on a stable operation. The changes of $NO_3$—N of the system are shown in FIG. 2-3, concentration of $NO_3$—N in inlet wastewater is between 15-45 mg/L while less than 5 mg/L in outlet water, which indicating the removal rate of $NO_3$—N maintains at above 95%, and the removal rate of TN maintains at about 90%.

Figure 4:
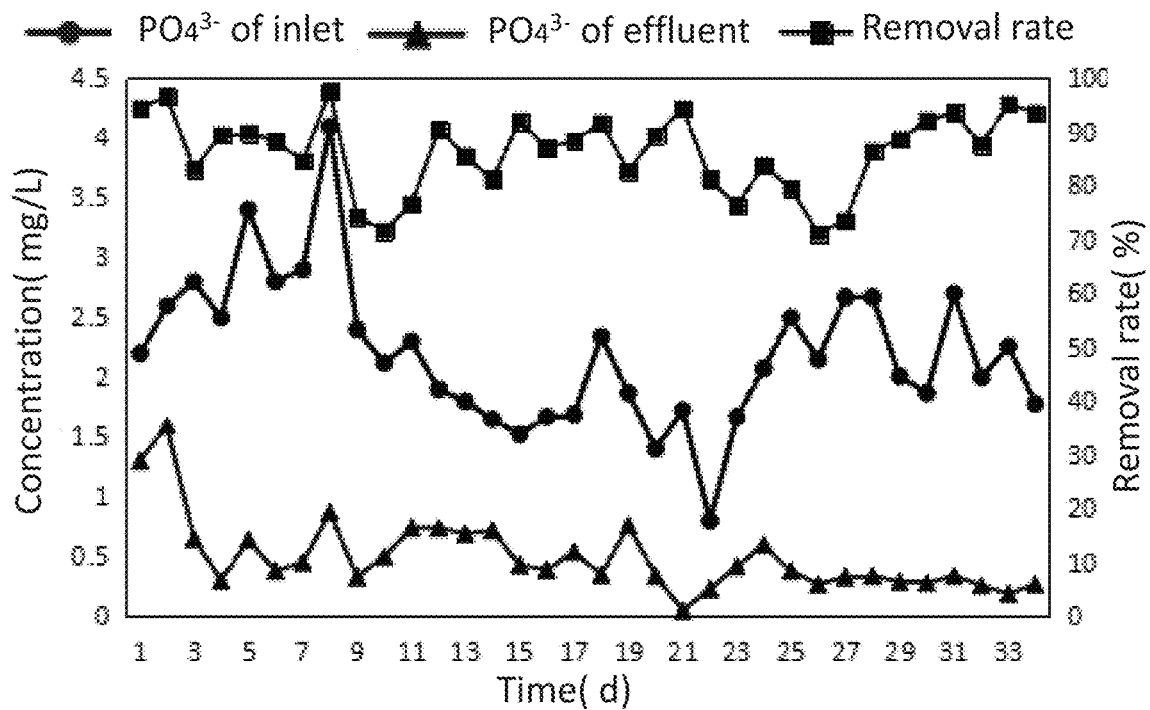
FIG. 4 illustrates the changes and removal rate of phosphate in the inlet and outlet water.
Figure 5:
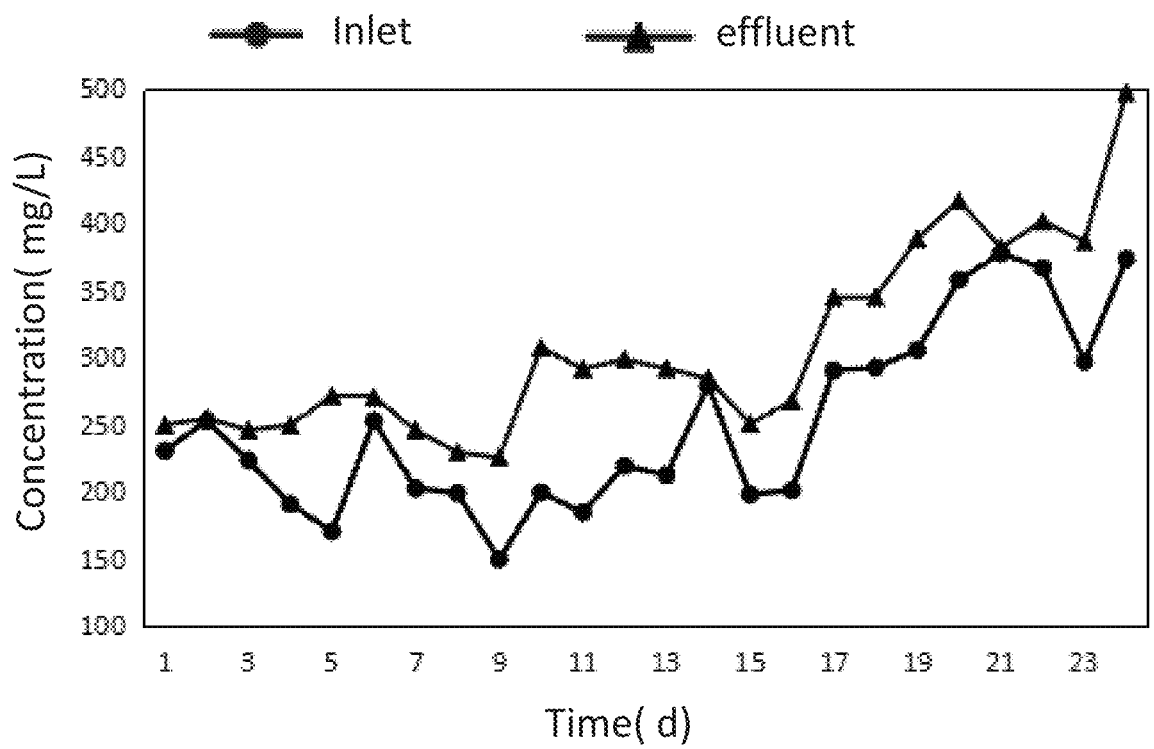
FIG. 5 illustrates the sulfate changes in the inlet and outlet water in the nitrogen and phosphorus removal unit.
Figure 6:
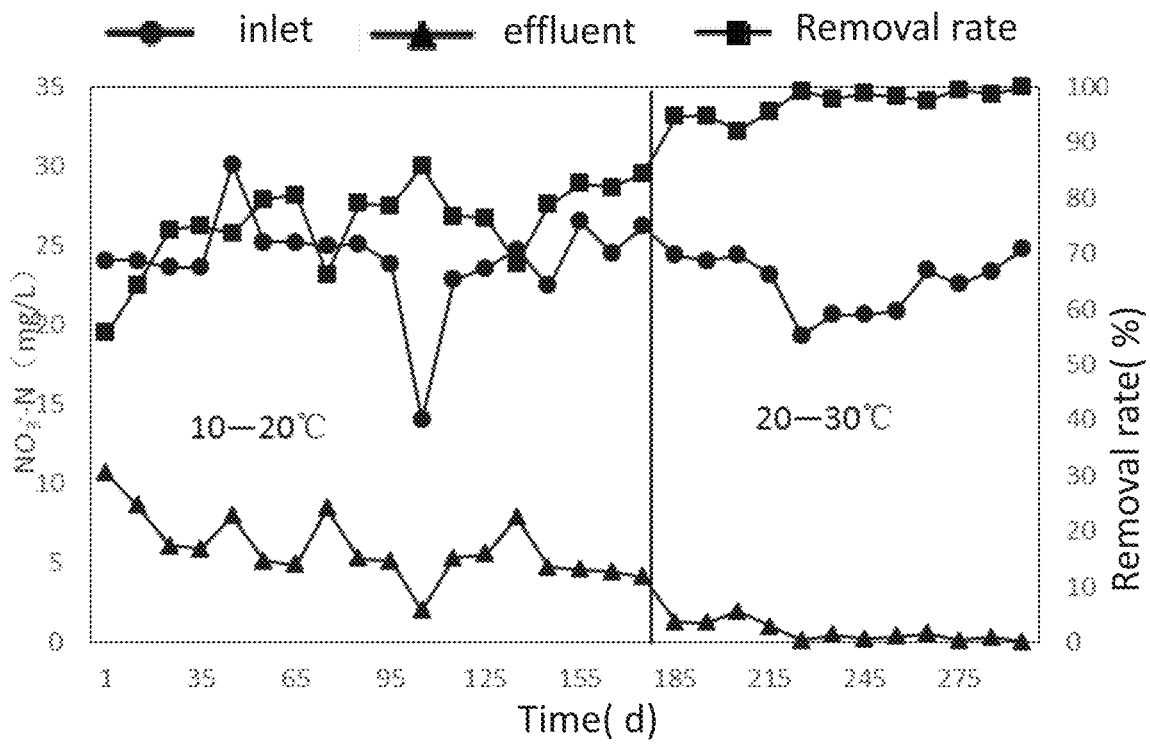
FIG. 6 illustrates the effect of denitrification at different temperatures.
Figure 7:
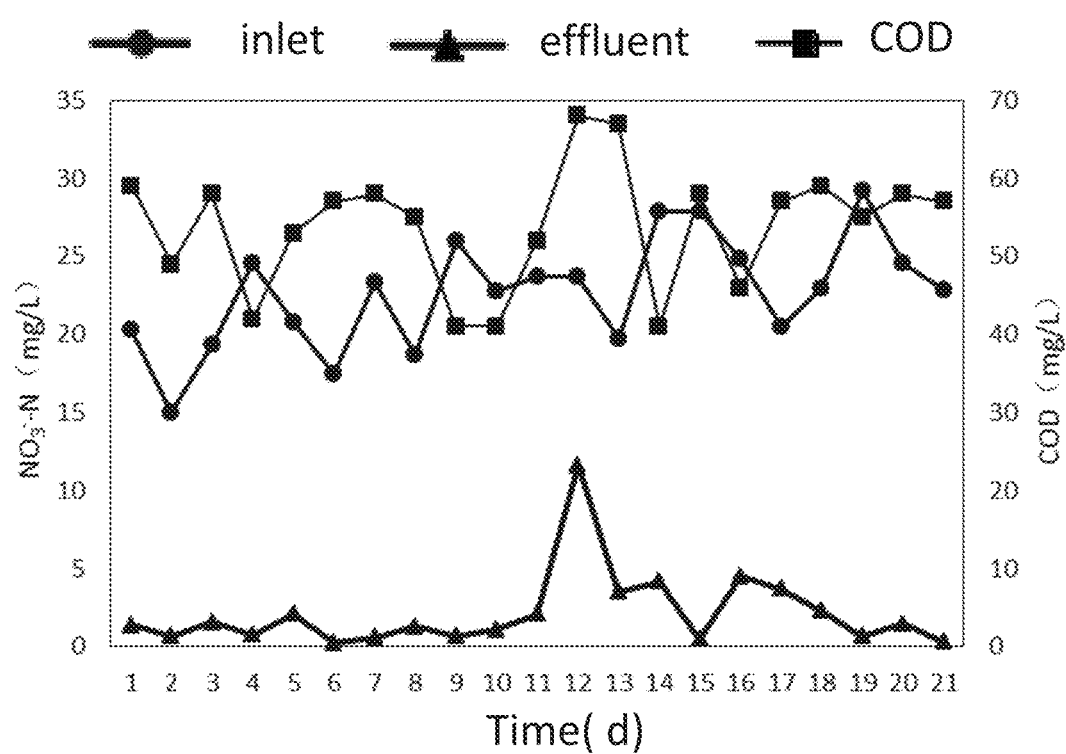
FIG. 7 illustrates the denitrification effect under different COD in wastewater.

The addition of iron can not only effectively neutralize the $H^+$ and $Fe^{2+}/Fe^{3+}$ that produced by autotrophic denitrification, but also react with phosphate and generate iron phosphate thereby, the iron phosphate precipitation can be easily removed and finally been discharged by back flushing. The iron fed into the system is usually alloy of pure iron or iron carbide. The iron carbide and impurities are dispersed in the solution in the form of tiny particles, which constitute a complete micro-battery circuit and from numerous corrosion micro-batteries. The $Fe^{2+}/Fe^{3+}$ can react with phosphate and generate iron phosphate precipitation, so that reduce the phosphate concentration from 1-4 mg/L to 0.5 mg/L (shown in FIG. 4). The average phosphate removal rate is 76%, and the maximum removal rate is 97%. Iron in the layer remove the phosphate and provide appropriate alkalinity for autotrophic denitrification process, maintains the stable operation of the system.

(3) Effect of Sulfate Adsorption Unit

The wastewater treated from the nitrogen and phosphorus removal unit is subsequently flowed to sulfate adsorption unit from the top of the unit to the bottom under the HRT of 2 h. The adsorption effect is shown in Table 2. Since the complexity of the sewage, some substance in the effluent may affect the adsorption effect of the modified hydrotalcite, leading to a lower adsorption capacity than the theoretical adsorption amount. The average adsorption capacity of the modified hydrotalcite to the sulfate is 55.2 mg/g.

TABLE 2

The effect of sulfate adsorption unit

| Sample | Initial concentration of sulfate (mg/L) | Final concentration of sulfate (mg/L) | Adsorption quantity (mg/g) |
|---|---|---|---|
| 1 | 433 | 231 | 50.5 |
| 2 | 472 | 222 | 62.5 |
| 3 | 420 | 210 | 52.5 |

The raw material filling in the present invention are solid sulfur, iron and hydrotalcite, which are effectively in avoiding the contamination that causes by liquid carbon sources addition. The autotrophic process on the basis of sulfur acting as an electron donor can effectively remove the nitrate of the sewage, which makes denitrification more complete. No nitrite has been detected in the treated effluent, and the maximum removal rate reaches to 100%. The HRT of the process is 2.35 h, which is much shorter than that in traditional A2O denitrification and phosphorus removal process (HRT 4-6 h). The amount of residual sludge is small, so as the area covered by the system. The combination of iron-carbon micro-electrolysis and sulfur autotrophic denitrification not only provides alkalinity for denitrification, maintains the pH stability for the system, but helps to phosphorus removal as well, which effectively reducing costs of the wastewater treatment, The efficiency of phosphorus removal is about 80%, the TP concentration of effluent is below 0.5 mg/L. The subsequent sulfate adsorption unit reduces the concentration of sulfate and leads to the average removal rate of sulfate at about 50%.

The nitrogen, phosphorus and hydrotalcite used in the denitrification and phosphorus removal plant of the present invention are solid, and can effectively avoid the contamination caused by adding the liquid carbon source. The autotrophic process can effectively remove the nitrate of the sewage, denitrification is more complete, the maximum removal rate can reach 100%, the effluent is no nitrite accumulation; and the required HRT of the system is 2.35 h. Compared with the traditional $A_2O$ denitrification and phosphorus removal process (HHT 4-6 h), The HRT of the system is short, the amount of residual sludge is small, and the area been used is small. The combination of iron-carbon micro-electrolysis and sulfur autotrophic denitrification not only provides alkalinity for denitrification, maintains system pH stability, ensures normal denitrification, but also increases phosphorus removal function and effectively reducing wastewater treatment costs. The efficiency of the treatment is about 80%, the effluent TP concentration is lower than 0.5 mg/L. Subsequent adsorbed sulfate treatment unit that packs with modified hydrotalcite effectively reduces the sulfate concentration in the effluent, which result to 50% average removal rate of sulfate. The technical scheme of the invention adopts the sulfur autotrophic denitrification, the iron-carbon microelectrolysis and the adsorption by modified hydrotalcite. The present method successfully test at the scale of 100 m$^3$, and obtains the desired effect. The $NO_3$—N The minimum concentration can be reduced to zero, the effluent TP concentration is less than 0.5 mg/L, the average removal rate of sulfate is more than 50%, and there is no adverse effect on the ecosystem.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A nitrogen and phosphorus removal system, comprising a nitrogen and phosphorus removal unit and a sulfate adsorption unit; wherein the nitrogen and phosphorus removal unit comprises a wastewater inlet at a bottom thereof and a wastewater outlet at a top thereof; wherein the nitrogen and phosphorus removal unit comprises different layers of a coarse sandy layer, a deoxidizing layer and a nitrogen and phosphorus removal layer; wherein the nitrogen and phosphorus removal layer comprises a mixture of sulfur and iron, with a weight ratio of sulfur and iron to be 3-6:1; wherein the sulfate adsorption unit comprises hydrotalcite, and is configured to connect with the nitrogen and phosphorus removal unit through pipes.

2. The nitrogen and phosphorus removal system of claim 1, wherein the mixture of sulfur and iron comprises sulfur granules filled with iron.

3. The nitrogen and phosphorus removal system of claim 1, wherein the deoxidizing layer comprises sulfur.

4. The nitrogen and phosphorus removal system of claim 1, further comprising a tank that is set in front of the nitrogen and phosphorus removal unit, and a pump that is set between the tank and the nitrogen and phosphorus removal unit.

5. A method for wastewater treatment, using the nitrogen and phosphorous removal system of claim 1, comprising treating wastewater successively through the nitrogen and phosphorous removal unit and the sulfate adsorption unit.

6. The method of claim 5, further comprising flowing wastewater in the nitrogen and phosphorus removal unit at 2~3 m$^3$/h, wherein the dissolved oxygen (DO) of the treated wastewater leaving from the deoxidizing layer is below 0.5 mg/L, the HRT is 0.2~0.5 h, and the flow rate is 7~9 m/h.

7. The method of claim 5, further comprising flowing wastewater in the nitrogen and phosphorus removal unit at 2.5 m$^3$/h, wherein the dissolved oxygen (DO) of the treated wastewater leaving from the deoxidizing layer is below 0.5 mg/L, the HRT is 0.35 h, and the flow rate is 8.8 m/h.

8. The method of claim 5, comprising a step of back flushing by flushing the nitrogen and phosphorus removal system at 40 m$^3$/h for 4~6 min.

* * * * *